United States Patent [19]

Muskopf et al.

[11] Patent Number: 5,350,802
[45] Date of Patent: Sep. 27, 1994

[54] IGNITION RESISTANT CARBONATE POLYMER BLENDS CONTAINING LOW MOLECULAR WEIGHT HALOGENATED EPOXY COMPOUNDS

[75] Inventors: Jack W. Muskopf, Lake Jackson, Tex.; M. Robert Christy, Midland, Mich.; Jaysn F. Jameson, deceased, late of Clute, Tex.; Jerry M. Jameson, heir; Donna R. Jameson, heiress, both of Early, Tex.; Tami S. Hallmark, Freeport, Tex.

[73] Assignee: The Dow Chemical Company, Midland, Mich.

[21] Appl. No.: 81,776

[22] Filed: Jun. 23, 1993

Related U.S. Application Data

[62] Division of Ser. No. 825,237, Jan. 24, 1992, abandoned.

[51] Int. Cl.$^5$ .................. C08L 69/00; C08L 63/02
[52] U.S. Cl. .......................... 525/65; 525/67; 525/108; 525/115; 525/133; 525/463; 524/109; 524/114
[58] Field of Search .................. 524/109, 114, 373; 525/65, 67, 108, 115, 133, 463

[56] References Cited

U.S. PATENT DOCUMENTS

| | | | |
|---|---|---|---|
| 4,456,732 | 6/1984 | Nambu et al. | 525/65 |
| 4,786,686 | 11/1988 | Laughner | 525/67 |
| 4,810,739 | 3/1989 | Lindner et al. | 524/371 |
| 4,879,329 | 11/1989 | Hongo et al. | 524/114 |
| 5,087,663 | 2/1992 | Laughner | 525/67 |

FOREIGN PATENT DOCUMENTS

| | | | |
|---|---|---|---|
| 0471852 | 2/1992 | European Pat. Off. | |
| 11017 | 4/1978 | Japan | |
| 015954 | 2/1979 | Japan | 525/463 |
| 54-91557 | 7/1979 | Japan | |
| 38624 | 2/1982 | Japan | |
| 61-11354 | 9/1986 | Japan | |
| 61-241322 | 10/1986 | Japan | |
| 61-241343 | 10/1986 | Japan | |

*Primary Examiner*—David Buttner

[57] ABSTRACT

Blends of carbonate and monovinylidene aromatic copolymers containing selected low molecular weight halogenated epoxy compounds, in combination with tetrafluoroethylene polymers, are shown to have surprising combinations of impact and ignition resistance and be very suitable for electroplating applications. In general the selected epoxy compounds can be represented by the following formula:

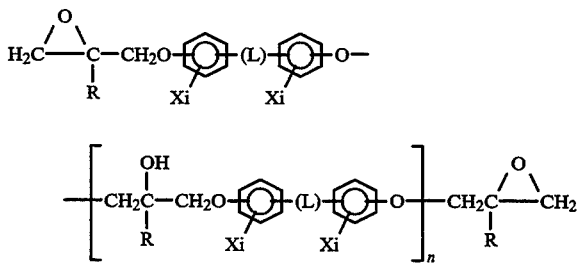

where, preferably, R is hydrogen; X is bromine; i is 2; L is 2,2-isopropyl; n is from 0 to 1. Polymer blends based on from about 65 to about 98 weight percent carbonate polymer, from about 2 to about 25 percent by weight monovinylidene aromatic copolymer, preferably rubber modified, and from 0 to about 10 percent by weight of a rubbery core/shell graft copolymer impact modifier are suitable for preparation of these compositions. It has been found desirable to employ from about 1 to about 20 percent by weight low molecular weight halogenated epoxy compound, and from 0.01 to about 2 percent by weight of a tetrafluoroethylene polymer.

13 Claims, No Drawings

IGNITION RESISTANT CARBONATE POLYMER BLENDS CONTAINING LOW MOLECULAR WEIGHT HALOGENATED EPOXY COMPOUNDS

Cross-Reference to Related Application. This is a divisional of application Ser. No., 825,237 filed Jan. 24, 1992 now abandoned.

The present invention relates to an impact resistant and ignition resistant composition based on a major portion of a carbonate polymer, a minor portion of a monovinylidene aromatic copolymer, and an optional amount of a rubbery core/shell graft copolymer impact modifier. Preferably the monovinylidene aromatic copolymer contains a reinforcing rubber material, which rubber-reinforced copolymers are often referred to as ABS or ABS-type resins.

It is well known that blends of a carbonate polymer and a monovinylidene aromatic copolymer, such as an ABS-type resin, can be prepared possessing desirable combinations of physical properties. These thermoplastic polymer blends are suitable for the manufacture of molded parts wherein impact strength, rigidity, toughness, heat resistance, and excellent electrical properties are required. However, it is usually desired to incorporate sufficient ignition resisting additives in such blends to enable the resin blend compositions to obtain the V-0 rating (1.62 millimeter or 1/16 inch samples) or 5V rating (3.18 millimeter or 1/8 inch samples) in the well known Underwriters Laboratory test referred to as UL 94.

In this regard, however, it has unfortunately been found that there are various disadvantages or tradeoffs that are observed when attempting to incorporate sufficient amounts of many of the known ignition resisting additives. Often one or more of the ignition resistant additives is found to cause degradation of one of the polymeric components, especially the carbonate polymer. In addition, if large amounts of the additive are required, the desirable physical properties of the resin blend are diluted by the typically undesirable physical properties of the additive compound. Moreover, some additives have chemical characteristics and/or processing characteristics that result in poor performance of the resin blend or parts prepared from the resin blend across the broad range of applications and processing equipment types wherein these types of resins can be employed.

In U.S. Pat. No. 4,879,329 it is taught that specified high molecular weight halogenated epoxy compounds can be used, in combination with an antimony compound, to make blends of carbonate and ABS-type polymers ignition resistant. In U.S. Pat. No. 4,810,739 it is taught that ignition resistant molding compositions based upon carbonate polymers and ABS-type polymers can be prepared by incorporating from 3 to 15 parts by weight of an organic halogen compound which can be a low molecular weight compound, an oligomeric compound or a polymeric compound. In addition, the ignition resistant additive formulation also includes from 0.05 to 5 parts by weight of an antimony or bismuth compound and from 0.05 to 0.5 parts by weight of a tetrafluoroethylene polymer. Unfortunately, however, the use of the antimony or bismuth compound results in unacceptable degradation of the carbonate polymer.

Japanese Patent Publications 50-027,843 (1975), 53-042,298 (1978), 61-211,354 (1986), 61-241,322 (1986) and 6-241,343 (1986) generally teach the use of brominated epoxy compounds in various types of polymers including ABS-type polymers or carbonate polymers. However, these references do not disclose or suggest the advantageous property combinations obtained when using certain low molecular, halogenated epoxy compounds in preparing ignition resistant blends of carbonate and monovinylidene aromatic polymers. In contrast to the teachings of these references, it has been found that the very desirable ignition resistant polymer blends, as further identified below, can be prepared without the incorporation of antimony or bismuth compounds by employing certain low molecular, halogenated epoxy compounds.

In one embodiment the present invention is an ignition resistant and impact resistant polymer resin consisting essentially of a polymer blend of: (a) from about 65 to about 98 weight percent carbonate polymer, (b) from about 2 to about 25 percent by weight monovinylidene aromatic copolymer, and (c) from 0 to about 10 percent by weight of a rubbery core/shell graft copolymer impact modifier, the weight percentages of components (a), (b), and (c) being based upon the weights of components (a), (b) and (c), which blend contains as ignition resistance additives: (d) from about 1 to about 20 percent by weight of a low molecular weight halogenated epoxy compound, and (e) from 0.01 to about 2 percent by weight of a tetrafluoroethylene polymer, the weight percentages of (d) and (e) based upon the weights of components (a), (b), (c), (d) and (e).

In a preferred embodiment the present invention is an ignition resistant and impact resistant polymer resin consisting essentially of a polymer blend of: (a) from about 75 to about 95 weight percent carbonate polymer, (b) from about 4 to about 15 percent by weight monovinylidene aromatic copolymer, and (c) from 1 to about 10 percent by weight of a rubbery core/shell graft copolymer impact modifier, the weight percentages of components (a), (b), and (c) being based upon the weights of components (a), (b) and (c), which blend contains as ignition resistance additives: (d) from about 3 to about 18 percent by weight of a low molecular weight halogenated epoxy compound, and (e) from 0.01 to about 2 percent by weight of a tetrafluoroethylene polymer. In a more preferred embodiment, a rubber reinforced monovinylidene aromatic copolymer is employed.

In an alternative embodiment the present invention is an improved electroplating process comprising the step of electroplating a molded part prepared from an ignition resistant and impact resistant polymer resin as described below. Further alternative embodiments of the present invention include a molded article prepared from the resin as described below and an electroplated article prepared by electroplating such a molded article.

It should be noted that these compositions preferably contain substantially no antimony or bismuth additive compounds, meaning no amounts of these compounds that would have a deleterious effect on the resin blend physical properties through degradation of the carbonate polymer molecular weight. Generally, this means less than about 2 weight percent, preferably less than 1 weight percent, more preferably less than 0.1 weight percent, and most preferably no measurable amount.

The claimed compositions are also desirably rendered ignition resistant without the use of phosphate-type additives and preferably contain substantially no phosphate additive compounds meaning no amounts of these compounds that would have a deleterious effect on the resin blend processability or platability. Generally, this means less than about 2 weight percent, preferably less than 1 weight percent, more preferably less than 0.1 weight percent, and most preferably no measurable amount. The phosphate additives, particularly the lower molecular weight (non-polymeric) phosphate ester additives, can exude or plate out to the surface of molded articles and reduce the "platability" of parts molded from the resins. Also, the lower molecular weight phosphates can cause problems with the processability of the resin due to their tendency to liquefy or "juice" during molten resin processing.

A key aspect of the present invention is the use of the specified halogenated epoxy compounds as the halogen source in providing an optimized balance of ignition resistance, physical properties and processability, including the ability to employ parts prepared from the resins in subsequent electroplating steps where that is desired.

These halogenated epoxy compounds are generally known in the art and are prepared by the coupling of epichlorohydrin and one or more diphenolic compounds or by the reaction of the appropriate diphenolic with an excess of the diglycidyl ether of the diphenolic compound. Suitable diphenolic compounds include tetrabromobisphenol A. Methods to prepare these compounds are described in C. A. May, *Epoxy Resins: Chemistry and Technology*, 2nd Edition, pp. 9–285 (1988). See also, for example, Japanese Patent Publications 50-027,843 (1975), 53-042,298 (1978), 61-211,354 (1986), 61-241,322 (1986) and 61-241,343 (1986) and U.S. Pat. No. 4,879,329 which are incorporated herein by reference. Compounds of this type are commercially available as DER 542, DER 511 and QUATREX 6410 brands of epoxy resin from The Dow Chemical Company and DP 452 brand epoxy resin from Ciba Geigy.

The halogenated epoxy compounds can be represented by the following general Formula I:

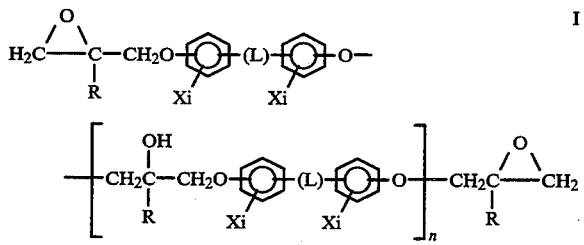

where R can independently be hydrogen or an aliphatic hydrocarbyl group having from 1 to about 3 carbon atoms and is preferably hydrogen; X is independently chlorine or bromine and is preferably bromine in each occurrence; i is independently 1 or 2 and is preferably 2 in each occurrence; L is independently a divalent hydrocarbyl group having from 1 to about 6 carbon atoms, preferably carbon atoms; n can be any value from 0 to 20 (not necessarily an integer) and is preferably from 0 to 6, more preferably from 0 to 1. The term hydrocarbyl as employed herein means any aliphatic, cycloaliphatic or aromatic groups.

In general, it has been found that the amount of brominated epoxy that can suitably be incorporated into the blends of the present invention depends somewhat on the balance of the carbonate and monovinylidene aromatic polymers, the more carbonate polymer being used, the lower the brominated epoxy concentration can be to obtain the desired ignition resistance while maintaining the physical properties. In general, at least about 1, preferably at least about 3, and more preferably at least about 5 weight percent brominated epoxy should be employed based on the weight of the polymer blend components. In order to maintain the desirable blend physical properties, it is desired to minimize the brominated epoxy level, using generally less than 20 weight percent, preferably less than 18 weight percent and more preferably less than 15 weight percent.

Carbonate polymers suited for use in this invention are well known in the literature and can be prepared by well known techniques. In general, the carbonate polymers can be prepared from one or more multi-hydric compounds by reacting the multi-hydric compound(s) such as a dihydric phenol with a carbonate precursor such as phosgene, a haloformate or a carbonate ester such as diphenyl carbonate. The carbonate polymers can be prepared from these raw materials by an appropriate process selected from one of the known polymerization processes such as the known interfacial, solution or melt processes.

Such carbonate polymers generally possess reoccurring structural units as shown in formula II:

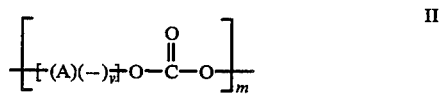

where m is the degree of polymerization; A is a radical having at least 2 valences which is a remnant of a multi-hydric compound, (—) represents valences of A connecting to a carbonate moiety as shown and v is the number of valences of A in excess of 1, an integer greater than or equal to 1. In general A is predominantly a dihydric compound remnant (v is 1) but, if branched polymers are intended, A can include amounts of a tri- or tetra-hydric compound remnant at low levels (v is greater than 1). Dihydric phenols are preferred multi-hydric compounds. The use of a dihydric phenol results in an aromatic carbonate polymer, the most typical of the carbonate polymers. The carbonate polymer molecules are usually terminated with the remnant of a monohydric compound or other monofunctional chain terminating compound.

Such carbonate polymers can be generally represented according to formula III:

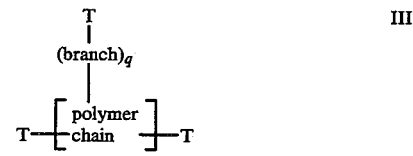

where T is independently the chain terminating remnant of a monohydric compound or other monofunctional chain terminating compound and q is the average number of polymer chain branches per polymer molecule, preferably from 0 to 0.05. In cases where branched polymer is specifically desired, q is preferably from 0.01 to 0.05.

In the aromatic carbonate polymers of the types which are currently commercially available and most often employed in thermoplastic molding applications, m is usually from about 30 to 315, representing aromatic polycarbonates with weight average molecular weights of from 15,000 to 200,000. See for example, "Polycarbonates", Encyclopedia of Polymer Science and Technology, Vol. 11, p. 648 (1987).

The dihydric phenols which are preferably employed as the multi-hydric compound to provide the aromatic carbonate polymers may contain one or more aromatic rings and contain as functional groups two or more hydroxyl moieties which are reactive with the carbonate precursor compound, each of which hydroxyl moiety is preferably attached directly to a carbon atom of an aromatic ring. Typical dihydric phenols are 2,2-bis-(4-hydroxyphenyl)-propane ("Bisphenol A"); hydroquinone; resorcinol; 2,2-bis-(4-hydroxyphenyl)-pentane; 2,4'-dihydroxy diphenyl methane; bis-(2-hydroxyphenyl) methane; bis-(4-hydroxyphenyl)-methane; bis(4-hydroxy-5-nitrophenyl)-methane; 1,1-bis-(4-hydroxyphenyl)-ethane; 3,3-bis-(4-hydroxyphenyl)-pentane; 2,2'-dihydroxydiphenyl; 2,6-dihydroxy naphthalene; bis-(4-hydroxyphenyl) sulfone; 2,4'dihydroxydiphenyl sulfone; 5'-chloro-2,4"-dihydroxydiphenyl sulfone; bis-(4-hydroxyphenyl) diphenyl disulfone; 4,4'-dihydroxydiphenyl ether; 4,4'-dihydroxy-3,3'-dichloro diphenyl ether; and 4,4'-dihydroxy-2,5-diethoxydiphenyl ether. The preferred carbonate polymer is prepared using a dihydric phenol, preferably Bisphenol A, as the multi-hydric compound.

In addition to preparing carbonate homopolymers using a single multi-hydric compound in the process, it is, of course, possible to employ two or more different multi-hydric compounds or a multi-hydric compound in combination with a glycol, a hydroxy terminated polyester, or a dibasic acid in the event a carbonate copolymer or polyester carbonate is desired. Desirably the carbonate copolymers according to the present invention would contain less than about 50, preferably less than about 20, more preferably less than about 10 percent and most preferably less than about 5 percent of an ester linking group. Most preferably the carbonate polymers according to the present invention, insofar as the multi-hydric compounds used, consist essentially of dihydric phenols which contain one or more aromatic rings and contain as functional groups two or more hydroxyl moieties which are attached directly to a carbon atom of an aromatic ring.

It is possible to employ a trihydric and/or tetrahydric phenol compound, as illustrated by the trihydric and/or tetrahydric phenols shown in U.S. Pat. No. 3,544,514, to prepare a randomly branched carbonate polymer which can be provided with terminal arylcyclobutene moieties. The randomly branched chain polycarbonates used in this invention are also well known to those skilled in the art and are prepared by reacting a dihydric compound with phosgene in the presence of a trihydric and/or tetrahydric compound as illustrated in U.S. Pat. No. 3,544,514. Generally such branched polymers can be obtained by the use of chain terminating compound in total amounts in the range of from about 0.04 to about 0.01 mole per mole of multi-hydric aromatic compound. Within this range of chain terminating compound amounts, the desired amount of branching, typically from 0.01 to 0.05 branches per polymer molecule, is then determined by the relative amounts of the chain terminating compound which are employed.

When a carbonate ester is used as the carbonate precursor in the polymer forming reaction, the materials are reacted at temperatures of from 100° C. or higher for times varying from 1 to 15 hours. Under such conditions ester interchange occurs between the carbonate ester and the multi-hydric compound used. The ester interchange is advantageously done at reduced pressures of the order of from about 10 to about 100 millimeters (mm) of mercury.

The carbonate polymer is employed in the blends of the present invention in amounts sufficient to provide the desired balance of physical properties and ignition resistance. In general the carbonate polymer is employed in amounts of at least about 65 weight percent, preferably at least about 75 weight percent and more preferably at least about 80 weight percent. In general the carbonate polymer is used in amounts up to and including about 98 weight percent, preferably about 95 weight percent, more preferably about 90 weight percent. These weight percentages of carbonate polymer are based on the total weight of the key polymeric components, carbonate polymer, monovinylidene aromatic copolymer, and optional rubbery core/shell graft copolymer impact modifier.

The monovinylidene aromatic copolymers suitably employed according to the present invention include copolymers of monovinylidene aromatic monomers, especially styrene, with one or more additional unsaturated, copolymerizable monomers, particularly the ethylenically unsaturated nitrile monomers (such as acrylonitrile and/or methacrylonitrile), maleic anhydride, alkyl methacrylate, N-substituted maleimide or other polymerizable comonomers. The monovinylidene aromatic copolymers suitably employed according to the present invention are preferably rubber modified copolymers of monovinylidene aromatic monomers. Rubber modified copolymers of the monovinylidene aromatic and ethylenically unsaturated nitrile monomers such as acrylonitrile and/or methacrylonitrile are particularly preferred. It is especially preferred to employ a butadiene polymer rubber modified copolymer of monovinylidene aromatic and ethylenically unsaturated nitrile monomers such as acrylonitrile and/or methacrylonitrile. Such copolymers are herein collectively referred to as ABS-type resins.

Preferred ABS-type resins are characterized by comprising a matrix phase of the monovinylidene aromatic copolymer having dispersed therein a particulate rubber phase, which rubber is preferably grafted with a compatibilizing amount of the same or different monovinylidene aromatic copolymer. Preferably, the rubber modified monovinylidene aromatic copolymers comprise at least 5 percent by weight rubber, more preferably at least 10 percent by weight rubber, based on the weight of rubber modified monovinylidene aromatic copolymers and not including the weight of the grafted compatibilizing monovinylidene aromatic copolymer in the rubber weight. The presence of a significant amount of an ungrafted matrix phase of monovinylidene aromatic copolymer (from about 50 to about 95, preferably from about 60 to about 90 weight percent based on weight rubber modified monovinylidene aromatic copolymer) distinguishes these compositions from the rubbery core/shell graft copolymer impact modifiers discussed below. ABS-type resins typically have a glass transition temperature (Tg) of greater than 0° C. generally greater than 20° C., preferably greater than 60° C. which Tg is dictated by the matrix phase polymer.

Preferred ABS-type resins are those prepared by the solution or bulk polymerization of styrene and acrylonitrile comonomers in the presence of butadiene polymer rubber and an optional solvent or diluent. Alternatively such ABS resins may be prepared by mixing together previously prepared matrices comprising the monovinylidene aromatic monomer, (meth)acrylonitrile, optional comonomer(s) and rubbery graft copolymers such as styrene/acrylonitrile grafted polybutadiene rubber or styrene/butadiene copolymer rubber lattices. In addition to polybutadiene or styrene/butadiene copolymer rubbers other suitable rubbers include the well known copolymers of ethylene and propylene optionally containing copolymerizable nonconjugated dienes (known as EPDM rubbers), polyacrylates such as polybutylacrylate and mixtures of the foregoing rubbers.

In general, the monovinylidene aromatic copolymer is employed in amounts to improve the processability of the blend composition and maintain the desired physical properties. The monovinylidene aromatic copolymer is typically incorporated into the blend of the present invention in amounts of at least about 2 weight percent, preferably at least about 4 weight percent and more preferably at least about 5 weight percent. In order to maintain the resin blend physical properties the monovinylidene aromatic copolymer is typically incorporated into the blend of the present invention in amounts up to and including about 25 weight percent, preferably 20 weight percent, and most preferably 15 weight percent based on total weight of the carbonate polymer, monovinylidene aromatic copolymer, and rubbery core/shell graft copolymer impact modifier.

Suitable rubbery core/shell graft copolymer impact modifiers which may optionally be incorporated into the resin blend of the present invention consist of at least 50 percent by weighty preferably greater than 50 percent by weighty and most preferably at least 60 percent by weight rubbery polymer. Such materials should have a glass transition temperature (Tg) of less than $-20°$ C., which Tg is dictated primarily by the rubbery polymer and not significantly impacted by the grafted portion. Examples of these materials include the grafted acrylate rubbers particularly those having a core-shell structure. The preferred rubbery core/shell graft copolymer impact modifiers are the grafted butadiene polymer rubbers having polymers of styrene and methylmethacrylate graft polymerized thereto. These are known in the art as MBS graft copolymers.

If employed, the optional rubbery core/shell graft copolymer impact modifier is preferably utilized in amounts necessary to obtain the desired degree of impact resistance. If used, the rubbery core/shell graft copolymer impact modifier is typically incorporated into the blend of the present invention in amounts of up to and including about 10 weight percent, preferably 8 weight percent, and most preferably 5 weight percent based on total weight of the carbonate polymer, monovinylidene aromatic copolymer, and rubbery core/shell graft copolymer impact modifier. In order to provide the desired resin blend physical properties the rubbery core/shell graft copolymer impact modifier is typically incorporated into the blend of the present invention in amounts of at least about 0.5 weight percent, preferably at least about 1 weight percent and more preferably at least about 2 weight percent.

Suitable tetrafluoroethylene polymers for use in this invention are those adapted to form a fibril structure to stabilize the polymer under molten conditions. Such polymers are often referred to as PTFE or Teflon and are generally disclosed for example by U.S. Pat. Nos. 3,005,795, 3,671,487 and 4,463,130, incorporated by reference herein. Most desirably the tetrafluoroethylene polymers have a high elastic memory. Some examples of tetrafluoroethylene polymers that have high elastic memory include Teflon TM 6C, 60, 64, 6CN, 65 and 67.

The amount of the tetrafluoroethylene polymer is preferably in the range from 0.01 to 2 weight percent and most preferably in the range from 0.02 to 1 weight percent based on total composition weight.

The carbonate polymer compositions of the present invention are suitably prepared by combining the ingredients in effective amounts using any of a variety of blending procedures conventionally employed for polymer blends of this type. For example, a teflon component in emulsion form can be preblended with an emulsion of one or more of the other components, such as the monovinylidene aromatic copolymer and/or the rubbery core/shell graft copolymer impact modifier, prior to combining with the remaining components and the resulting blend further melt blended. Dry particulate components can be combined in various sequences such as: simultaneous combining and dry blending of fine particulates of the components and additives; initial combination of a fine teflon particulate with a fine particulate form of one or more of the other components, such as the carbonate polymer or halogenated epoxy compound, followed by combination with the remaining components/additives; or dry blending a fine particulate teflon with a premixed dry blend of the other components.

The combining of the dry particulates is then typically followed by further melt blending and extrusion steps to form resin pellets. The subsequent melt blending and/or melt processing temperature(s) are desirably limited to temperatures less than 325° C., preferably less than 300° C.

The blends of carbonate and ABS-type polymers according to the present invention can be employed in mixtures, alloys or blends with other polymer resins, including mixtures with polyester. In addition, other additives can be included in the carbonate polymer of the present invention such as metal salt-type ignition resistance additives, antistatic agents, fillers (i.e., glass fibers), pigments, dyes, antioxidants, heat stabilizers, ultraviolet light absorbers, mold release agents and other additives commonly employed in carbonate polymer compositions.

As mentioned above, the blends according to the present invention possess very desirable combinations of properties that make them suitable for use in a number of different applications such as injection molding processes for the production of business machine parts and housings and the like, extrusion and thermoforming. In particular, the blends are found to be very suitable for the production of electroplated or metallized parts where a molded article is provided with a metallic surface coating. These processes are well known in the art and are generally described in "Metallizing", Vol. 9, *Encyclopedia of Polymer Science and Engineering*, pages 580 to 622, John Wiley and Sons (1987).

The following Experiments are given to further illustrate the invention and should not be construed as limiting its scope. In the following Experiments, all parts and percentages are by weight unless otherwise indicated.

The melt flow rate of the polycarbonate resins were measured according to ASTM D-1238, condition "I". The notched Izod impact resistance is tested according to ASTM D-256-72A on 3.18 millimeter ($\frac{1}{8}$ inch) samples that have been injection molded at 270° C. The results ("N. Izod") are given in foot pounds per inch (ft lb/in) with the results in Joules per meter (J/m) being given in parentheses.

The resistance to ignition of the polymer compositions is shown by the V-0 and 5V UL-94 tests performed according to ASTM D-4804-88 on 1.62 millimeter (1/16 inch) and 3.18 millimeter (1/8 inch) samples, respectively. The ductile/brittle transition temperature (DBTT) is given in degrees C and was measured by ASTM D 256-72A on 1/8 inch samples in an environmental chamber. The DBTT is the temperature at which half the bars break in a ductile fashion and half in a brittle fashion.

Experiment 1

A range of low molecular weight brominated epoxy compounds corresponding generally to the following Formula IV were obtained to illustrate the practice of the present invention:

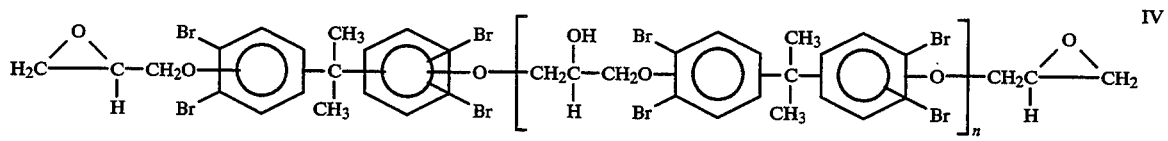

These compounds are summarized in Table I below.

Epoxy Compound No. 1 is Quatrex 6410, available from The Dow Chemical Company. The other brominated epoxy compounds varying in their degree of polymerization (epoxide content) were prepared by the copolymerization of DER 542 brand brominated epoxy with appropriate equivalents of tetrabromobisphenol A using methyl triphenyl phosphonium acetate as a catalyst to get the desired degree of polymerization. DER 542 brand brominated epoxy is a diglycidyl ether of tetrabromobisphenol A, commercially available from The Dow Chemical Company.

Table I below shows the percent epoxide and degree of polymerization for the several epoxy compounds. The degree of polymerization was calculated from the percent epoxide content according to the following formula: n=[(8600/%Epoxide)-655.6]/599.6. The values for the epoxide contents of samples were determined by titration with perchloric acid and tetraethylammonium bromide in acetic acid. This method is described by C. A. May in *Epoxy Resins: Chemistry and Technology*, 2nd Edition, pp 9-28 (1988).

TABLE I

| Epoxy Compound No. | Weight percent epoxide | Degree of polymerization or "n" value |
|---|---|---|
| 1 | 9.55 | 0.4 |
| 2 | 9.55 | 0.4 |
| 3 | 2.81 | 4.0 |
| 4 | 2.02 | 6.0 |

A series of ignition resistant blends is prepared by combining the epoxy compound as identified in Table I above with the following components:

(a) Carbonate Polymer—A heat stabilized polycarbonate resin having a melt flow of 22 (CALIBRE® 300 available from The Dow Chemical Company).

(b) Rubber modified monovinylidene aromatic copolymer—A mass polymerized, butadiene rubber modified copolymer of styrene and acrylonitrile containing about 12 weight percent rubber and about 16 weight percent acrylonitrile, having an ungrafted monovinylidene aromatic copolymer content in the range of about 75% (±5%) by weight.

(c) Rubbery core/shell graft copolymer impact modifier-Butadiene rubber grafted with styrene and methylmethacrylate polymer, commercially available as Paraloid TM 8967 from Rohm & Haas, having a Tg of about −60° C., and containing about 70 percent by weight polybutadiene and substantially no ungrafted styrene and/or methylmethacrylate polymer.

(e) Tetrafluoroethylene polymer—Commercially available Teflon TM 6C powder from du Pont Chemical Company.

In addition, all of the samples also contained 4 weight parts or 0.2 weight percent Irganox 1076 brand antioxidant, commercially available from Ciba Geigy. Irganox is a registered trademark of Ciba Geigy.

The Teflon was added to a preblended mixture of the other components, followed by dry blending for an additional six minutes then extrusion into pellets using a twin screw extruder at 230° C. barrel temperature. The extruded pellets are dried in an air draft of 100° C. for 4 hours. The resulting extruded dried pellets are injection molded into test bars for testing of ignition resistance and impact properties. The compositions of the various experimental compositions, in terms of the component amounts, are summarized in Table II below. The results of the ignition resistance and impact resistance testing of these blends is shown in Table III below.

TABLE II

| | Blend Compositions Blend Composition in wt parts (and wt %'s) | | | | |
|---|---|---|---|---|---|
| IR PC/ABS Comp. No. | Polymer Components (wt % based on a + b + c) | | | IR Additives (wt % based on a + b + c + d + e) | |
| | (a) PC | (b) ABS | (c) MBS | (d) Epoxy | (e) Teflon |
| 1–4 | 1590 (85.9) | 200 (10.8) | 60 (3.2) | 140 (7) | 6 (0.3) |
| 5 | 1630 (86.2) | 200 (10.6) | 60 (3.2) | — | 6 (0.3) |

TABLE III

| | | Blend Properties | | | | |
|---|---|---|---|---|---|---|
| Blend Comp. No. | Epoxy Compnd No. | n | MFR (grams/ 10 Min.) | Izod$^a$ | DBTT (°C.) | UL 94 Rating |
| | | | | | | V-0$^b$ 5V$^c$ |
| 1 | 1 | 0.4 | 5.4 | 14.0 (756) | −8.3 | Pass Pass |
| 2 | 2 | 0.4 | 4.0 | 13.0 (702) | −8.3 | Pass Pass |
| 3 | 3 | 4.0 | 3.3 | 13.0 (702) | −10.6 | Pass Pass |
| 4 | 4 | 6.0 | 3.0 | 13.0 (702) | −12.2 | Pass Pass |
| 5 | none | — | — | 11.4 | — | Fail Fail |

TABLE III-continued

| Blend Comp. No. | Epoxy Compnd No. | n | Blend Properties | | | | |
| --- | --- | --- | --- | --- | --- | --- | --- |
| | | | MFR (grams/ 10 Min.) | Izod$^a$ | DBTT (°C.) | UL 94 Rating | |
| | | | | | | V-0$^b$ | 5V$^c$ |
| | | | | (616) | | | |

$^a$Izod Impact at 4.4° C. (40° F.) in Joules per meter (J/m) with the value in foot pounds per inch (ft lb/in) shown in parentheses.
$^b$V-0 results measured on 1/16 inch samples.
$^c$5V results measured on ⅛ inch samples The above results indicate that the presence of the selected, low molecular weight brominated epoxies in the above resin blend imparts surprisingly improved polymer properties, particularly the combinations of notched Izod impact resistance and resistance to ignition.

What is claimed is:

1. An ignition resistant and impact resistant polymer resin consisting essentially of a polymer blend of:
    (a) from about 65 to about 98 weight percent carbonate polymer,
    (b) from about 2 to about 25 percent by weight monovinylidene aromatic copolymer, and
    (c) from 0 to about 10 percent by weight of a rubbery core/shell graft copolymer impact modifier,
the weight percentages of components (a), (b), and (c) being based upon the weights of components (a), (b) and (c), which blend contains as ignition resistance additives:
    (d) from about 1 to about 20 percent by weight of a low molecular weight halogenated epoxy compound according to the following Formula I,

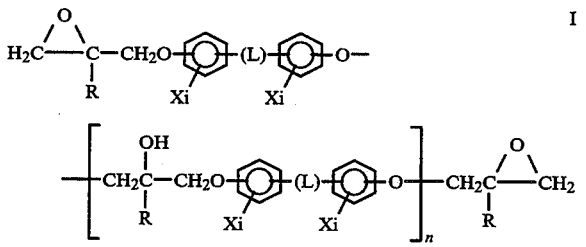

where R is independently hydrogen or a hydrocarbyl group having from 1 to about 3 carbon atoms: X is independently Cl or Br; i is independently 1 or 2; L is independently a divalent hydrocarbyl group having from 1 to about 6 carbon atoms; n is from 0 to 20,
    (e) from 0.01 to about 2 percent by weight of a tetrafluoroethylene polymer, and
    (f) less than about 1 percent by weight antimony or bismuth additive compounds the weight percentages of (d), (e) and (f) based upon the weights of components (a), (b), (e), (d), (e) and (f).

2. An ignition resistant and impact resistant polymer resin according to claim 1 consisting essentially of a polymer blend of:
    (a) from about 75 to about 95 weight percent carbonate polymer,
    (b) from about 4 to about 15 percent by weight monovinylidene aromatic copolymer, and
    (c) from 1 to about 10 percent by weight of a rubbery core/shell graft copolymer impact modifier,
the weight percentages of components (a), (b), and (c) being based upon the weights of components (a), (b) and (c), which blend contains as ignition resistance additives:
    (d) from about 3 to about 18 percent by weight of a low molecular weight halogenated epoxy compound,
    (e) from 0.01 to about 2 percent by weight of a tetrafluoroethylene polymer, and
    (f) less than about 1 percent by weight antimony or bismuth additive compounds,
the weight percentages of (d), (e) and (f) based upon the weights of components (a), (b), (c), (d), (e) and (f).

3. A molded article prepared from the resin according to claim 1.

4. An ignition resistant and impact resistant polymer resin according to claim 1 wherein X is bromine and i is 2 in each occurrence.

5. An ignition resistant and impact resistant polymer resin according to claim 1 wherein L is 2, 2-isopropyl.

6. An ignition resistant and impact resistant polymer resin according to claim 1 wherein n is a value from 0 to about 6.

7. An ignition resistant and impact resistant polymer resin according to claim 6 wherein n is a value from 0 to about 1.

8. An ignition resistant and impact resistant polymer resin according to claim 7 wherein n is a value from 0 to about 1, L is 2, 2-isopropyl, X is bromine and i is 2 in each occurrence.

9. An ignition resistant and impact resistant polymer resin according to claim 1 containing less than about 0.1 percent by weight antimony or bismuth additive compounds.

10. An ignition resistant and impact resistant polymer resin according to claim 1 containing substantially no phosphate additives.

11. An ignition resistant and impact resistant polymer resin according to claim 1 containing substantially no further halogen-containing additives.

12. An ignition resistant and impact resistant polymer resin according to claim 1 wherein the monovinylidene aromatic copolymer is rubber reinforced.

13. An ignition resistant and impact resistant polymer resin according to claim 8 wherein the monovinylidene aromatic copolymer is rubber reinforced.

* * * * *